United States Patent [19]

Townsend

[11] Patent Number: 5,388,480

[45] Date of Patent: Feb. 14, 1995

[54] PRETENSIONING MECHANISM FOR TENSION ELEMENT DRIVE SYSTEMS

[75] Inventor: William T. Townsend, Weston, Mass.

[73] Assignee: Barrett Technology, Inc., Cambridge, Mass.

[21] Appl. No.: 102,085

[22] Filed: Aug. 4, 1993

[51] Int. Cl.⁶ .................... B25B 25/00; B66F 19/00
[52] U.S. Cl. ................. 74/501.5 R; 254/220; 242/388.5
[58] Field of Search ............ 74/501.5 R; 254/220; 242/388.1, 388.5

[56] References Cited

U.S. PATENT DOCUMENTS 796,720  8/1905  Hanscom .................. 74/501.5 R
3,240,473  3/1966  Coffey et al. .............. 254/220 X

*Primary Examiner*—Charles A. Marmor
*Assistant Examiner*—Mary Ann Battista
*Attorney, Agent, or Firm*—Iandiorio & Teska

[57] ABSTRACT

A pretensioning mechanism for tension element drives includes a drive pinion including a pinion shaft and a pinion sleeve; a first tension element end anchor on the pinion shaft for securing one end of a tension element wound around the drive pinion in a first direction and a second tension element end anchor on the pinion sleeve for securing the end of another tension element wound around the drive pinion in a second, opposite direction; and a worm drive including a worm gear on one of the pinion sleeve and pinion shaft and a worm on the other of the pinion sleeve and pinion shaft for relatively counter-rotating said pinion shaft and pinion sleeve for simultaneously in a single action adjusting and fixing the pretension on the tension element.

1 Claim, 3 Drawing Sheets

PRETENSIONING MECHANISM FOR TENSION ELEMENT DRIVE SYSTEMS

FIELD OF INVENTION

This invention relates to a cable pretensioning mechanism for tension element drives.

BACKGROUND OF INVENTION

Cable drives have taken on increased importance in mechanical transmissions used for small high-performance automated equipment. Increased exploitation of computer control places a higher value on light-weight, compact machines that react quickly to motor commands, and often these characteristics are achieved through the use of cable drives.

When properly designed, cable drives have high material strength, low weight, low velocity and torque ripple, no backlash, and low friction. Furthermore, they do not leak, do not require surface lubrication, and can be guided over long distances around pulleys through complex and twisting geometries. Cables and all other tension-element drives, such as tapes and belts, do not transfer power through compression or shear; and as a result they avoid added compliance and strength limitations found in gear teeth, linkages, and push rods, caused by bending moments or buckling. When designed for reliability, cable drives have a history of dependability in such demanding applications as aerial trams, ski lifts, cable cars, light-aircraft control surfaces, cranes, and elevators.

Generally, high performance is maintained only when the cables are pretensioned to roughly one-half of their maximum operating tensions. Several methods have been used to apply this pretension. All of the previous methods require substantial effort (30-120 minutes). One use of this new class of cable drive is in a robot arm used in oceanographic exploration. In such circumstances equipment reliability and maintainability are essential. For a given dive the equipment is transported by surface ships, where much of it is welded directly to the ship's deck to withstand rough seas. The ship then sails halfway around the world to the dive site. Once there, the manipulator arm is mounted on a submersible vehicle and lowered to some of the deepest ocean locations on earth. The exploration typically involves multiple dives. Each person on the vessel focuses on preparing the sub for its next dive. The cost per hour is enormous at this point.

During resurfacing, the cables on the robot manipulator are checked and retensioned if necessary while surface maintenance is performed on the submersible. If the cable maintenance exceeds a few minutes, it becomes the critical path. Using the current technique, the arm must be partially disassembled first. Next, three functions must be accomplished simultaneously and flawlessly: maintain existing tension in the cable circuit; keep the gap between the pinion halves below 0.001 inch by maintaining an axial force; and reset pretension.

These simultaneous functions require three wrenches and a screwdriver to be manipulated by three technicians. A lock nut or jam nut is loosened while the two parts of a split pinion are held against motion which would allow the cable to loosen and whip off the various drive pulleys. While holding the pinion against motion one must be counter-rotated against the other to pretension the cable. Then while the pinion halves are once again held motionless the lock nut must be tightened. If one of the technicians slips and either releases existing pretension or allows the 0.001-inch gap to open axially under cable stress, then the entire cable drive (generally multiple stages and many separate cables) has to be recabled. Recabling may require several technician-hours of labor. The entire recabling process still requires the final pretensioning.

SUMMARY OF INVENTION

It is therefore an object of this invention to provide an improved pretensioning mechanism for a tension element drive system.

It is a further object of this invention to provide such a pretensioning mechanism which adjusts and sets tension element pretension in a single action.

It is a further object of this invention to provide such a pretensioning mechanism which can be operated by a single person using only one hand.

It is a further object of this invention to provide such a pretensioning mechanism which eliminates the risk of losing tension on a tension element while attempting to adjust pretension on it.

It is a further object of this invention to provide such a tension element pretensioning mechanism which eliminates the need for a locking nut or a locking device.

It is a further object of this invention to provide such a tension element pretensioning mechanism which prevents any axial gap from forming between the two pinion halves thereby preventing the tension element from tailing irreversibly into the gap.

The invention results from the realization that the problems associated with pretensioning tension elements such as cables using three hands to loosen the lock nut while holding the pinion halves against rotational and axial motion, then counter-rotating them to apply pretension, then holding them in the new position while tightening the lock nut, can be eliminated with a pretensioning mechanism which simultaneously adjusts and fixes the pinion halves and pretensions the tension elements by using a worm drive with the worm on one pinion half and the worm gear on the other.

This invention features a pretensioning mechanism for a tension element drive system. There is a drive pinion including a pinion shaft and a pinion sleeve. A first tension element end anchor is located on the pinion shaft for securing one end of a tension element wound around the drive pinion in a first direction. A second tension element end anchor is located on the pinion sleeve for securing the end of another tension element wound around the drive pinion in a second, opposite direction. A worm drive is provided including a worm gear on one of the pinion sleeve and pinion shaft and a worm on the other of the pinion sleeve and pinion shaft for relatively counter-rotating the pinion shaft and pinion sleeve for simultaneously in a single action adjusting and fixing the pretension on the tension element. The invention is useful in any drive system based on tension elements which require pretension, for example cable drives, metal tape drives, chain drives and belt drives.

DISCLOSURE OF PREFERRED EMBODIMENT

Other objects, features and advantages will occur to those skilled in the art from the following description of a preferred embodiment and the accompanying drawings, in which.

This invention may be accomplished with a tension element pretensioning mechanism for a tension element drive system. There is a split drive pinion that includes a pinion shaft and a pinion sleeve which is rotatable on the shaft. There is a tension element end anchor on the pinion shaft for securing one end of a tension element wound around the drive pinion in a first direction and another tension element end anchor on the pinion sleeve for securing the end of another tension element wound around the drive pinion in a second, opposite direction. A worm drive is provided which includes a worm gear on one of the pinion sleeve and pinion shaft and a worm on the other of the pinion sleeve and pinion shaft. When it is desired to adjust the pretension on the tension elements it is simply necessary in a single action to rotate with a torque wrench the worm, which both adjusts and holds the tension. The worm drive both relatively counter-rotates the pinion shaft and pinion sleeve relative to one another, and holds them both rotationally and axially in whatever position occurs when the operator ceases further turning of the worm.

Figure 1:
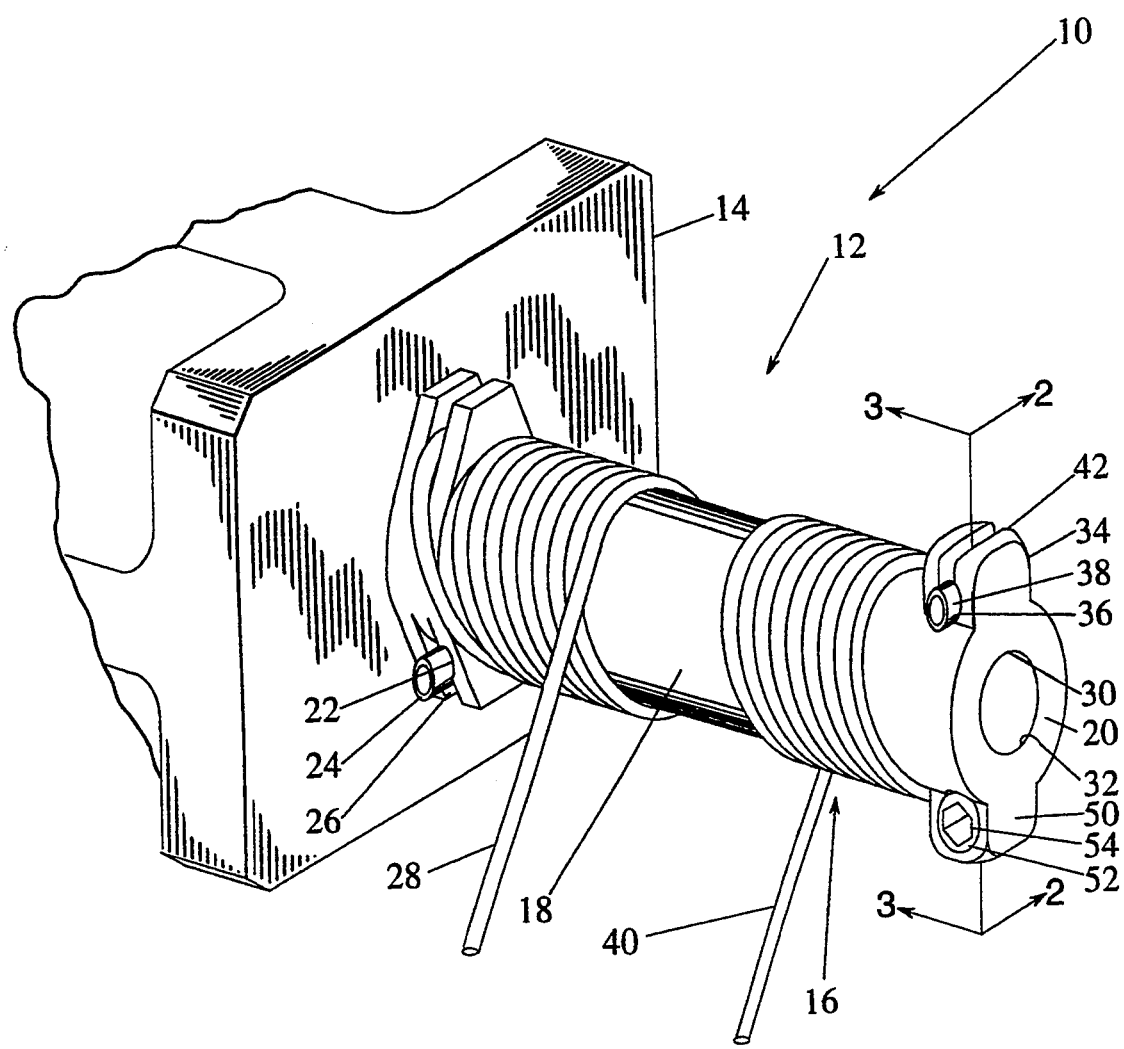
FIG. 1 is a three-dimensional view of a tension element pretensioning mechanism according to this invention in a cable drive system driven by an electric motor.

There is shown in FIG. 1 a cable pretensioning mechanism 10 included in a cable drive system 12 driven by electric motor 14. Cable drive system 12 includes a drive pinion 16 that includes a pinion sleeve 20 and a pinion shaft 18 driven with motor 14. Pinion shaft 18 includes a cable and anchor recess 22 which receives the cable terminator plug 24. A slot 26 extending from recess 22 directs cable 28 out and around pinion 16 in a counter-clockwise direction.

Pinion sleeve 20 includes internal bore 30 which rotatably mounts on reduced shoulder 32 of pinion shaft 18. Boss 34 of pinion sleeve 20 includes a cable and anchor recess 36 which receives the cable terminator plug 38. Cable 40 extends through slot 42 in boss 34 from terminator plug 38 and winds around drive pinion 16 in the clockwise direction opposite to that of cable 28. Boss 50 on pinion sleeve 20 contains worm 52 which forms a part of the cable pretensioning mechanism 10 according to this invention.

Figure 2:
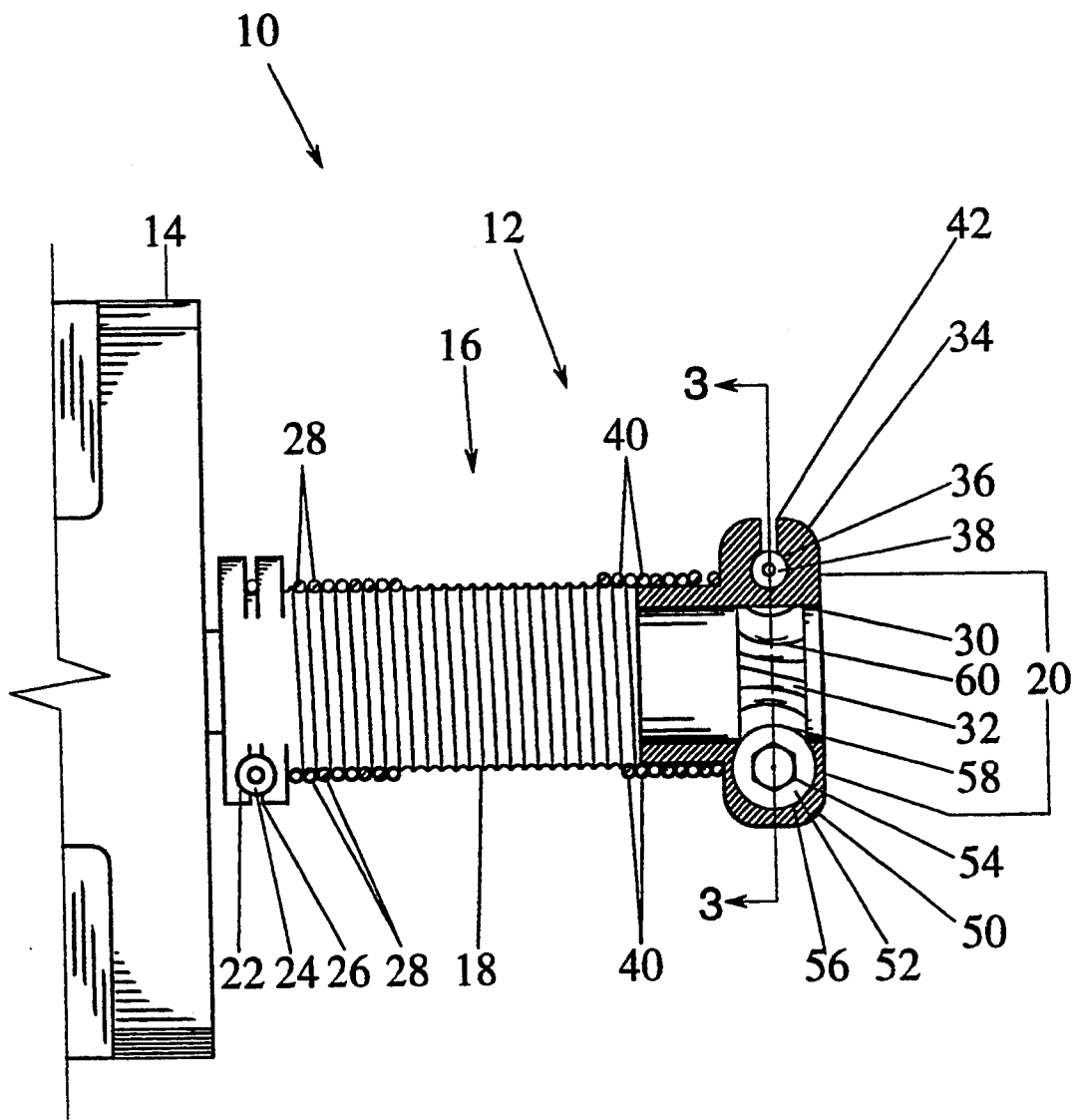
FIG. 2 is a cross-sectional view taken along lines 2—2 of FIG. 1.
Figure 3:
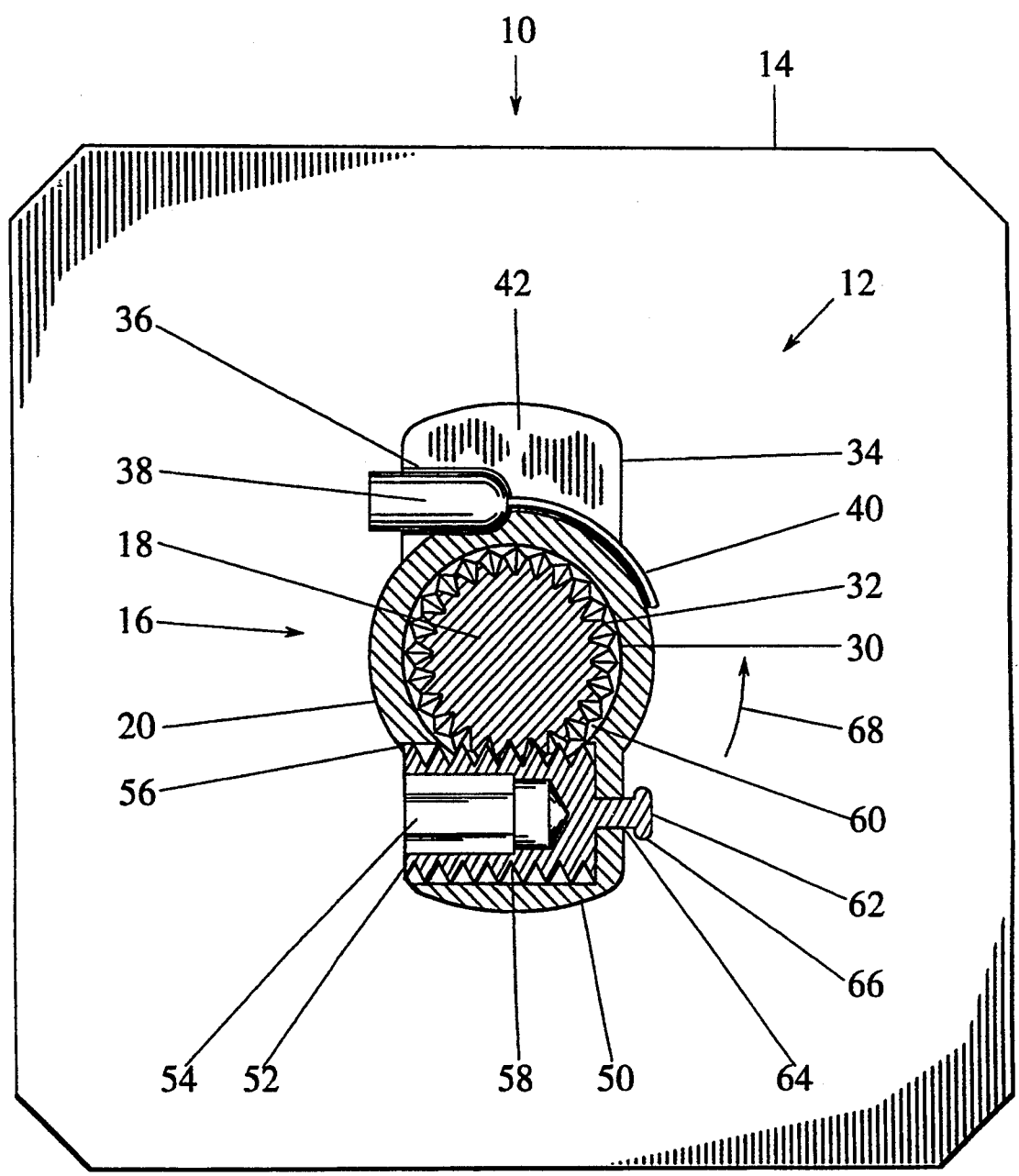
FIG. 3 is a cross-sectional view taken along lines 3—3 of FIGS. 1 and 2.

Cable pretensioning mechanism 10, FIGS. 2 and 3, include worm 52 having a hex wrench recess 54 in its head so that it can be turned for example with a torque wrench to achieve precisely the proper pretensioning on the cables. Worm 52 is disposed in bore 56 in pinion sleeve 20. Threads 58 on worm 52 engage with threads 60 on the reduced shoulder 32 of pinion shaft 18. By simply using an allen head wrench to turn worm 52, pinon sleeve 20 is caused to rotate with respect to pinion shaft 18 and thereby pretension cables 28 and 40. Worm 52 may be rotatably mounted in boss 50 by means of pin 62 which extends through bore 64 and is peened over as at 66. This ensures that worm 52 will not fall out of bore 56 under any circumstances. Normally this is not a problem and pin 62 with peened over end 66 need not be used. In that case, when a major cabling installation is done pinion sleeve 20 can be rotated in the direction of arrow 68 to cause worm 52 to kick out so that tensioning can be done very quickly in a coarse mode. Then when tensioning is substantially complete, worm 52 is reinstalled and turned using a hex head wrench in hex head recess 54 to complete the final stage of pretensioning. The worm also prevents the sleeve from moving axially in relation to the shaft to prevent a gap from forming into which the cable would irreversibly fall.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A tension element pretensioning mechanism a tension element drive, comprising:
   a drive pinion including a pinion shaft and a pinion sleeve;
   a first tension element end anchor on said pinion shaft for securing one end of a tension element wound around said drive pinion in a first direction and a second tension element end anchor on said pinion sleeve for securing the end of another tension element wound around said drive pinion in a second, opposite direction; and
   a worm drive including a worm gear on one of said pinion sleeve and pinion shaft and a worm on the other of said pinion sleeve and pinion shaft for relatively counter-rotating said pinion shaft and pinion sleeve for simultaneously in a single action adjusting and fixing the pretension in the tension element.

* * * * *